US012710888B2

(12) United States Patent
Ye

(10) Patent No.: US 12,710,888 B2
(45) Date of Patent: Aug. 18, 2026

(54) CONTIGUOUS PAGE DETECTION FOR LIVE MIGRATION

(71) Applicant: MICRON TECHNOLOGY, INC., Boise, ID (US)

(72) Inventor: Hua Ye, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/888,761

(22) Filed: Sep. 18, 2024

(65) Prior Publication Data

US 2026/0064303 A1 Mar. 5, 2026

Related U.S. Application Data

(60) Provisional application No. 63/688,524, filed on Aug. 29, 2024.

(51) Int. Cl.
*G06F 3/06* (2006.01)

(52) U.S. Cl.
CPC .......... *G06F 3/0647* (2013.01); *G06F 3/0604* (2013.01); *G06F 3/0679* (2013.01)

(58) Field of Classification Search
CPC ..... G06F 3/0647; G06F 3/0604; G06F 3/0679
See application file for complete search history.

(56) References Cited

U.S. PATENT DOCUMENTS

| | | | |
|---|---|---|---|
| 9,251,230 B2 | 2/2016 | Brown et al. | |
| 2010/0023478 A1 | 1/2010 | Chandrasekar et al. | |
| 2014/0164697 A1 | 6/2014 | Murata et al. | |
| 2018/0060100 A1 | 3/2018 | Tsirkin et al. | |
| 2018/0067850 A1 | 3/2018 | Kawamura et al. | |
| 2019/0155726 A1 | 5/2019 | Bhatia et al. | |
| 2020/0089620 A1 | 3/2020 | Hsu et al. | |
| 2021/0406050 A1 | 12/2021 | Huang et al. | |
| 2022/0066806 A1 | 3/2022 | Ramanathan et al. | |
| 2022/0206938 A1* | 6/2022 | Shin | G06F 12/0246 |
| 2022/0405253 A1 | 12/2022 | Agrawal et al. | |
| 2023/0004317 A1* | 1/2023 | Wu | G06F 3/0688 |
| 2023/0033903 A1 | 2/2023 | Della Monica et al. | |
| 2023/0121646 A1 | 4/2023 | Veluswamy et al. | |
| 2024/0061575 A1* | 2/2024 | Winterfeld | G06F 3/064 |

* cited by examiner

*Primary Examiner* — Francisco A Grullon
(74) *Attorney, Agent, or Firm* — Lowenstein Sandler LLP

(57) ABSTRACT

A host command to track migration of a set of memory pages is received. One or more bitmaps associated with the set of memory pages is identified. Whether a subset of a plurality of physical memory pages storing the one or more bitmaps is addressable by a contiguous set of physical addresses is determined. The subset of the plurality of physical memory pages by a single memory initialization operation is initialized responsive to determining that the subset of the plurality of physical memory pages is addressable by a contiguous set of physical addresses.

18 Claims, 5 Drawing Sheets

CONTIGUOUS PAGE DETECTION FOR LIVE MIGRATION

RELATED APPLICATIONS

This application claims the benefit of U.S. Provisional Patent Application No. 63/688,524, filed Aug. 29, 2024, which is incorporated by reference herein.

TECHNICAL FIELD

Embodiments of the disclosure relate generally to memory sub-systems, and more specifically, relate to contiguous page detection for live migration.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
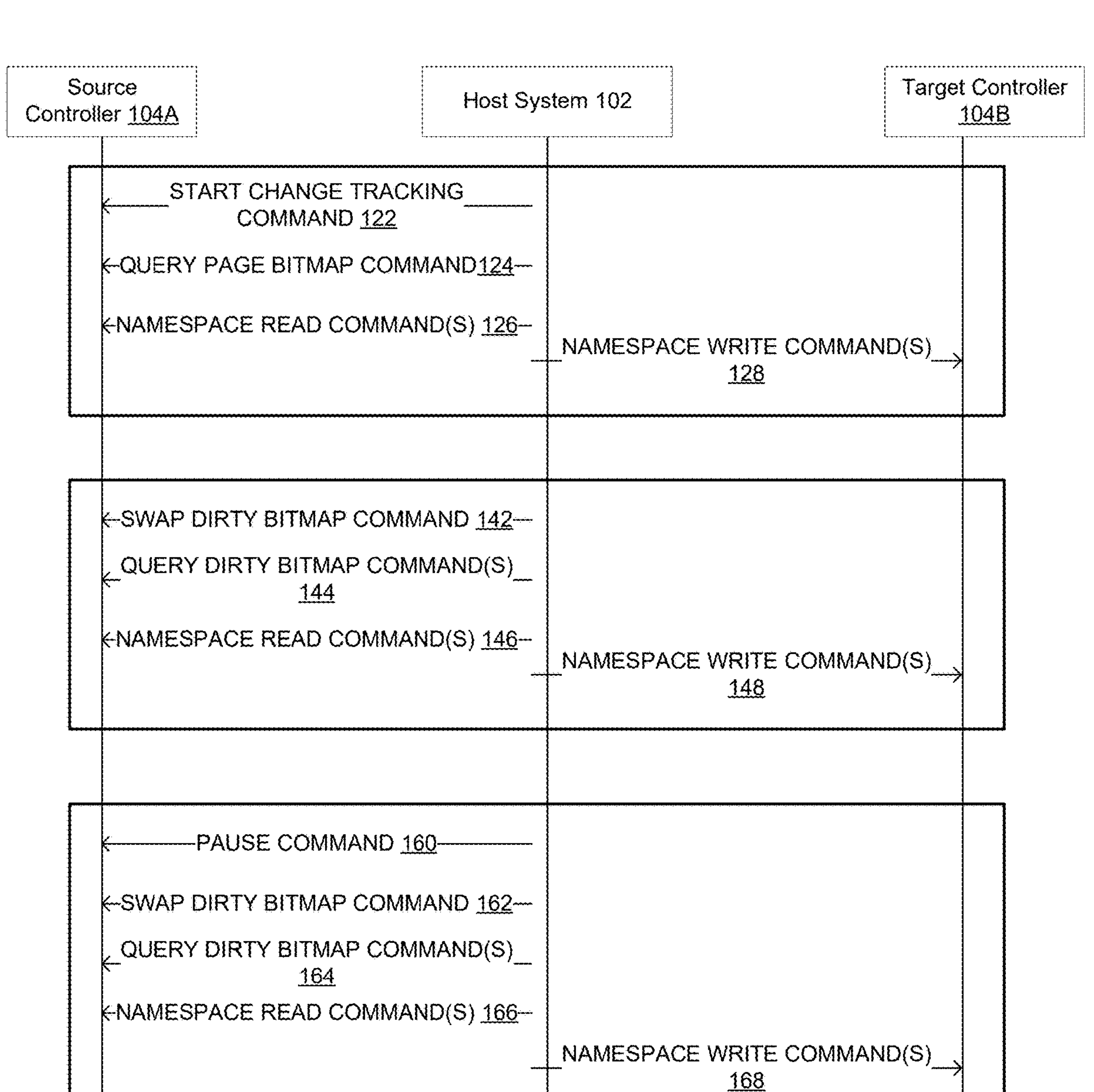
FIG. 1A is a sequence diagram of an example live migration in accordance with some embodiments of the present disclosure.

Aspects of the present disclosure are directed to contiguous page detection for live migration. A memory sub-system can be a storage device, a memory module, or a combination of a storage device and memory module. Examples of storage devices and memory modules are described below in conjunction with FIG. 2. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 2. A non-volatile memory device is a package of one or more dies. Each die can includes of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of memory cells arranged in a two-dimensional or a three-dimensional grid. Memory cells are formed onto a silicon wafer in an array of columns and rows. The memory cells are joined by wordlines, which are conducting lines electrically connected to the control gates of the memory cells, and bitlines, which are conducting lines electrically connected to the drain electrodes of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

In certain memory devices, such as a nonvolatile memory express (NVMe) memory device, the host system can use a logical address space to access the memory device. When the host system requests to access data (e.g., read data, write data), the host system can send a memory access command to the memory device, where the memory access command specifies a logical address from the logical address space. The logical address can identify a logical unit, such as a logical block. For some types of memory devices, a logical block is the smallest write/read unit. For example, the size of data in a logical block can be 512 bytes, 4096 bytes (4 KB), etc., depending on the specification of the memory device. In certain memory devices, a logical block can be a group of logical pages. A logical page is an abstraction of physical pages. A memory sub-system can define a logical page to be equal to a particular unit of physical storage (e.g., a physical page, a physical block, etc.). A logical block address (LBA) is an identifier of a logical block. In an addressing scheme for logical blocks, logical blocks can be identified by their respective integer indices, for example, with the first block being LBA 0, the second being LBA 1, and so on.

In certain memory devices, the logical address space of the memory device can be divided into namespaces that allow for more efficient management of data. A namespace is a portion of the logical address space, and each namespace can be mapped, through an address mapping data structure, to multiple logical blocks. For example, one or more LBAs can be mapped to a particular namespace. Each namespace can be referenced using a corresponding namespace identifier (namespace ID). For each namespace, the memory sub-system controller can store namespace metadata, for example, a namespace-specific address mapping data structure (e.g., a namespace logical to physical (L2P) table) in a memory device. The namespace-specific address mapping data structure can indicate capabilities and settings that are specific to a particular namespace, and can be created, updated, or deleted, e.g., using NameSpace Management and Namespace Attachment commands as defined by the NVM Express® (NVMe) Specification.

Live migration, in the context of NVMe memory devices, refers to the process of transferring data of a namespace and associated metadata from a controller of a source memory device (e.g., source controller) to a controller of a target memory device (e.g., target controller while maintaining continuous data availability and minimizing disruption to ongoing operations. Once a live migration is triggered by a host, the host sends a start tracking command to the source controller to begin tracking the state and modifications of pages of the namespace throughout the migration process.

In response to receiving the start tracking command, the source controller allocates memory for a set of bitmaps. The set of bitmaps includes a page bitmap and two or more dirty bitmaps. The two or more dirty bitmaps are swapped during live migration. During each iteration a dirty bitmap is being used to track changes (e.g., active dirty bit map(s)), the other dirty bitmaps are being read to determine which pages to copy (e.g., passive dirty bit map(s)). After each iteration, their roles are swapped, ensuring that all changes are captured efficiently without missing any modifications during the copy process.

After allocating the memory for the set of bitmaps, the source controller initializes the set of bitmaps. The source controller, to initialize each bitmap, sets (e.g., writes) all bits in a respective bitmap to a specific value (e.g., zero). For contiguous allocation, the source controller sets all bits within the entire allocated block for the bitmap to the specific value. In non-contiguous allocation, for each bitmap, the source controller using an array of pointers associated with a respective bitmap, sets each bit in a portion of the allocated memory for a logical page of a respective bitmap to the specific value.

During an initial phase of the migration, the source controller sequentially reads and copies all pages of the namespace to the target controller, updating the page bitmap as each page is successfully transferred. Upon completion of a copy of all pages, the migration transitions into an intermediate phase of the migration. During the intermediate phase of the migration, the source controller uses multiple dirty bitmaps to track the data pages that have been modified on the source memory device after having been copied to the destination memory device. These modified ("dirty") pages can then be copied to the destination memory device.

The source controller allows I/O operations to ensure uninterrupted host access. When a write operation occurs, the corresponding bit in a dirty bitmap of the multiple dirty bitmaps (designated as active) is set indicating a modification to a corresponding page. The source controller continuously monitors the rate of change and amount of unsynchronized data. The transition from the intermediate phase to the final phase of migration is triggered when a predefined threshold condition is satisfied. This threshold is based on continuous monitoring of two key metrics: (1) the rate of change of data on the source device, and (2) the total amount of unsynchronized data between the source and destination devices. The system initiates the final phase when these metrics indicate that the data state has reached a sufficient level of stability and synchronization. Specifically, the threshold may be satisfied when the rate of change drops below a certain value, or when the amount of unsynchronized data falls within a predetermined range, or a combination of both conditions. This approach ensures that the final synchronization can be executed efficiently, minimizing both the duration of the final phase and the potential for data inconsistency.

Once the final phase of the migration is triggered, I/O operations are briefly paused, the remaining modified ('dirty') pages are copied to the destination memory device, ensuring complete data consistency. The namespace on the target controller is activated. Once the namespace is activated on the target controller, the host sends a stop tracking command to the source memory device to stop tracking modifications to the namespace.

During non-contiguous allocation of memory for the set of bitmaps, the source controller divides each bitmap into multiple logical pages of a predefined size and allocates memory for each logical page separately (e.g., non-contiguous allocation). The source controller maintains an array of pointers for each bitmap, where each entry corresponds to a logical page of a respective bitmap and contains an initial physical address of the allocated memory for the logical page (e.g., a pointer). The initial physical address stores a first bit of the logical page of the respective bitmap, and any specific bit within the logical page is accessed through calculated offsets from the initial physical address of the allocated memory for the logical page. Non-contiguous allocation allows for more flexible memory utilization, especially for very large namespaces. However, non-contiguous allocation introduces additional complexity in bit access and page management.

The additional complexity of non-contiguous allocation presents a significant challenge in meeting host requirements for certain operations (e.g., operations associated with the start tracking command and stop tracking command) to be completed within a predetermined timeframe (e.g., 100 milliseconds). Most notable during the initialization of the set of bitmaps in response to the start tracking command. In the current implementation, due to the non-contiguous nature of the set of bitmaps, the source controller iterates through each logical page of a bitmap, using the array of pointers to locate the physical memory for a respective logical page of the bitmap, and performs a memory set operation on the respective logical page of the bitmap. Thus, each logical page of the set of bitmaps is initialized individually, which can be time-consuming. As a result, sequential initialization may cause the operation to exceed the strict timing constraints imposed by the host, potentially leading to migration failures or performance issues.

Aspects of the present disclosure address the above and other deficiencies by having a memory sub-system that identifies contiguous portions of memory to perform memory set operations. For each subset of a plurality of logical pages of a respective bitmap, the memory sub-system controller determines whether a respective subset of memory pages is stored in a contiguous set of physical pages, and if so, the respective subset of memory pages may be efficiently processed using a single operation rather than a series of operations for each memory page of the subset of memory pages.

A trivial way to determine whether the physical addresses of the subset of logical pages are contiguous would involve sorting those physical addresses ascertaining that there are no gaps between any two consecutive physical addresses. However, the computational complexity of such a sorting operation would be O(N log N), where N is the number of memory pages in the subset.

A better computational complexity may be achieved by avoiding the sorting operation and applying a heuristic technique instead. The heuristic technique is based upon the observation that if the physical addresses are indeed sorted (e.g., in the ascending order) and there are no gaps between any two consecutive physical addresses, then any given physical address would be equal to the previous physical address incremented by one, or to the first physical address (the minimum address in the sequence) incremented by the ordinal number of the given physical address in the sequence and decremented by one. Thus, the sum of all physical addresses of a subset of contiguous physical pages would be equal to the first physical address (the minimum address in the sequence) multiplied by the number of pages in the subset of pages and incremented by the sum of all above-described increments applied to each physical address in the sequence, i.e., the sum of the first integers up to the one that is less than the total number of pages in the set. Notably, computing such a sum does not require sorting the physical addresses, thus keeping the computational complexity at ( ) N).

Advantages of the present disclosure include, but are not limited to, improving performance by reducing the number of operations performed during initialization of the physical pages associated with the set of bitmaps thereby increasing the likelihood of completing the operations within predetermined timeframe.

FIG. 1A is a sequence diagram illustrating an example live migration 100, in accordance with some embodiments of the present disclosure. Host system 102, may initiate a live migration of a namespace from a controller of a source memory sub-system (e.g., a source controller 104A) to a controller of a target memory sub-system (e.g., a target controller 104B).

In an initial phase 110, the source controller 104A receives the start tracking command 122 from the host system 102 to track changes to the namespace. The source controller 104A, in response to the start tracking command 122, allocates local memory of the source controller 104A for a set of bitmaps. The set of bitmaps can include a page bitmap, a first dirty bitmap, and a second dirty bitmap. After allocation, the source controller 104A initializes the set of bitmaps.

Figure 1B:
FIG. 1B illustrates an example set of bitmaps used for the live migration of FIG. 1A in accordance with some embodiments of the present disclosure.

With quick reference to FIG. 1B, a page bitmap 191 is structured as a large array of bits, a first dirty bitmap 193 is structured as a large array of bits, and a second dirty bitmap 195 is structured as a large array of bits. Each bit of the page bitmap 191, first dirty bitmap 193, and second dirty bitmap 195 corresponds to a specific page in the namespace. As previously described, the page bitmap 191 may be divided into a plurality of logical pages (e.g., logical pages 192A-n), the dirty bitmap 193 may be divided into a plurality of logical pages (e.g., logical pages 194A-n), and the dirty bitmap 195 may be divided into a plurality of logical pages (e.g., logical pages 196A-n). The page bitmap 191 is initialized by setting the bits in each logical page of logical pages 192A-n with a bit value of "1" which indicates that the specific page in the namespace (associated with the bit) needs to be transferred. Thus, a bit value of "0" indicates that the specific page in the namespace (associated with the bit) has already been transferred or doesn't need transfer. The first dirty bitmap 193 and second dirty bitmap 195 is initialized by setting the bits in each logical page of logical pages 194A-n and the bits in each logical page of logical pages 196A-n with a bit value of "0" which indicates that the specific page in the namespace (associated with the bit) has not been modified since the last transfer. Thus, a bit value of "1" indicates that the specific page in the namespace (associated with the bit) has been modified since the last transfer.

Returning to FIG. 2, after initializing the set of bitmaps, the source controller 104A engages in an iterative process with the host system 102. The source controller 104A receives a series of query page bitmap commands 114, each requesting information about a specific range of pages in the page bitmap. These commands specify a starting page number (or offset) and a number of pages to query. The source controller 104A processes each command by accessing the requested portion of the page bitmap and responds with the corresponding bitmap data. After each query response, the source controller 104A may receive one or more namespaces read operations 116 from the host system 102. These read operations correspond to the pages identified as needing transfer based on the bitmap data provided in the previous query response. Each read operation specifies a starting LBA and the number of blocks to read. The source controller 104A retrieves the requested page data from the memory device(s) of the source memory sub-system and transfers it to the host system 102.

Concurrently with or immediately following each namespace read operation 116, the host system 102 initiates a corresponding namespace write operation 118 to the target controller 104B. Each write operation includes the page data retrieved from the source controller 104A and the corresponding LBA range where the data should be written on the target controller 104B. The target controller 104B writes the received page data to memory devices(s) of the target memory sub-system. After each successful read-write cycle for a specific page, the source controller 104A receives an update command (not shown) from the host system 102 to clear the corresponding bit in the page bitmap 191, marking the page as successfully transferred. If a page is modified in the namespace of the source controller 104A during the initial phase 110, the page will be marked in a currently active dirty bitmap (e.g., the first dirty bitmap).

In an intermediate phase 120, the host system 102 sends a swap dirty bitmap command 142 to the source controller 104A. When the swap dirty bitmap command 142 is received, the source controller 104A switches the roles of the active and passive dirty bitmaps. The currently active dirty bitmap (e.g., the first dirty bitmap) becomes passive (available for host queries), and the currently passive dirty bitmap (e.g., the second dirty bitmap) becomes active (used to track new changes).

The source controller 104A receives a series of query dirty bitmap commands 144 from the host system 102. Each query dirty bitmap command 144 requests information about a specific range of pages in the passive dirty bitmap (e.g., the first dirty bitmap). The source controller 104A responds with the requested portions of the bitmap data. Following each of the query dirty bitmap command 144, the source controller 104A receives namespace read operations 146 for pages identified as needing transfer. The source controller 104A retrieves and transfers the requested page data to the host system 102. After each successful read operation, the source controller 104A receives commands to update the page bitmap, marking transferred pages as complete. The intermediate phase 120 including swapping dirty bitmaps, responding to queries, and performing read operations and write operations repeats until a predetermined threshold is met. Throughout the intermediate phase 120, the source controller 104A continues to track modifications in a currently active dirty bitmap (e.g., the second dirty bitmap). Once the threshold is met, the source controller 104A proceeds to a final phase 150.

In the final phase 150, the host system 102 sends a pause command 160 to temporarily suspend all input/output (I/O) operations to the namespace being migrated. The host system 102 then issues another swap dirty bitmap command 162 to the source controller 104A, switching the roles of the active and passive dirty bitmaps one last time. Following the final swap, the host system 102 issues a series of query active dirty bitmap commands 164 to the source controller 104A. As before, these commands query the passive dirty bitmap to identify any pages that were modified since the last iteration. The host system 102 processes the responses to determine which pages, if any, still need to be transferred. For each page identified as needing transfer, the host system 102 initiates a corresponding namespace read operation 166 from the source controller 104A, followed immediately by a namespace write operation 168 to the target controller 104B. After completing these final read-write cycles, the host system 102 performs a final verification to ensure that all pages have been successfully transferred and that the namespace on the target controller 104B is fully synchronized with the source. Once verified, the migration process can be completed, and normal I/O operations can resume on the target controller 104B.

After the final phase 150, the host system 102 sends a stop tracking command 180 to the source controller 104A. The source controller 104A receives the stop tracking command 180. The stop tracking command 180 suspends tracking of any changes to the namespace.

Figure 2:
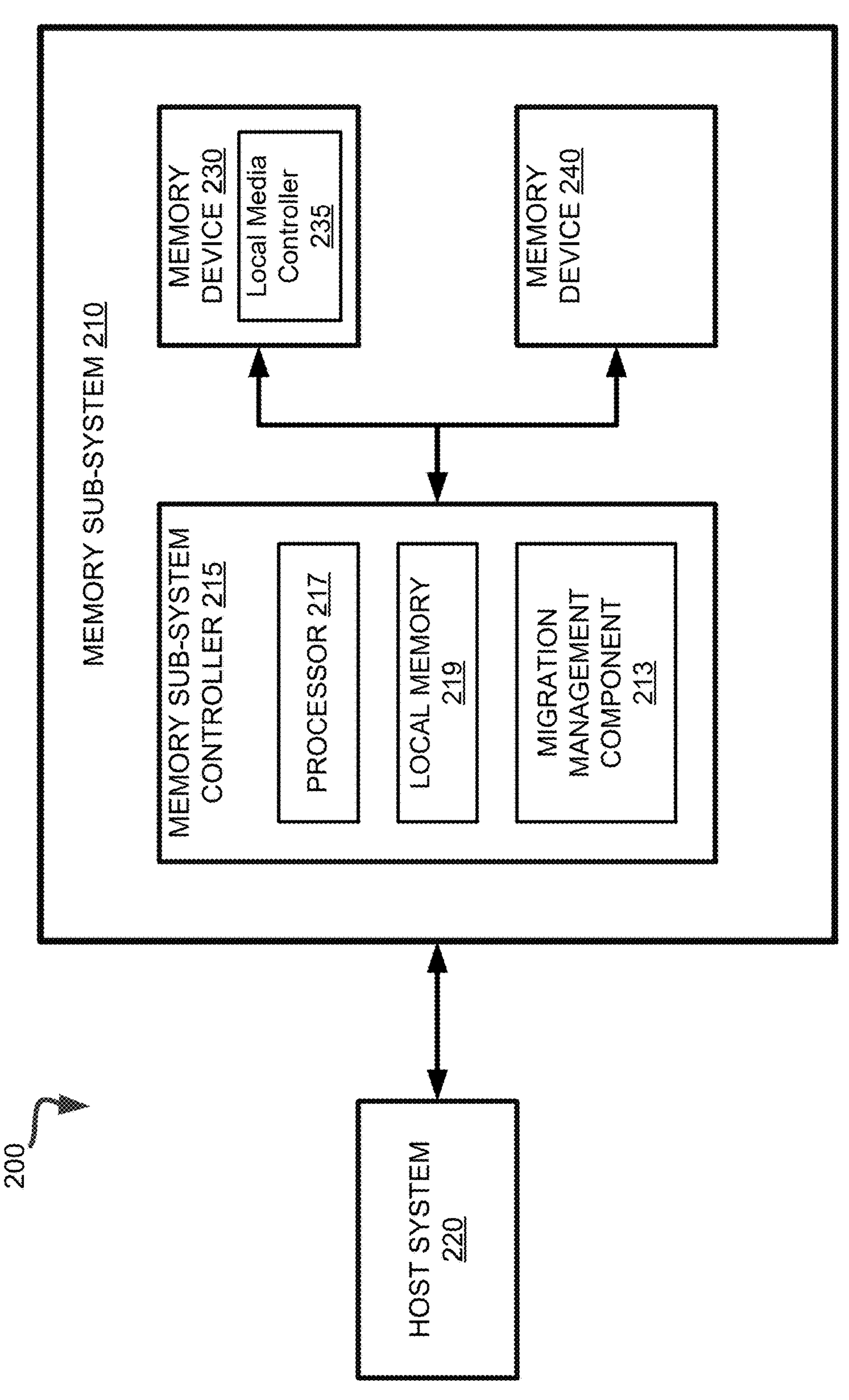
FIG. 2 illustrates an example computing system that includes a memory sub-system in accordance with some embodiments of the present disclosure.

FIG. 2 illustrates an example computing system 200 that includes a memory sub-system 210 in accordance with some embodiments of the present disclosure. The memory sub-system 210 can include media, such as one or more volatile memory devices (e.g., memory device 240), one or more non-volatile memory devices (e.g., memory device 230), or a combination of such.

A memory sub-system 210 can be a storage device, a memory module, or a combination of a storage device and memory module. Examples of a storage device include a solid-state drive (SSD), a flash drive, a universal serial bus (USB) flash drive, an embedded Multi-Media controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 200 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 200 can include a host system 220 that is coupled to one or more memory sub-systems 210. In some embodiments, the host system 220 is coupled to multiple memory sub-systems 210 of different types. FIG. 2 illustrates one example of a host system 220 coupled to one memory sub-system 210. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 220 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 220 uses the memory sub-system 210, for example, to write data to the memory sub-system 210 and read data from the memory sub-system 210.

The host system 220 can be coupled to the memory sub-system 210 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 220 and the memory sub-system 210. The host system 220 can further utilize an NVM Express (NVMe) interface to access components (e.g., memory devices 230) when the memory sub-system 210 is coupled with the host system 220 by the physical host interface (e.g., PCIe or CXL bus). The physical host interface can provide an interface for passing control, address, data, and other signals between the memory sub-system 210 and the host system 220. FIG. 2 illustrates a memory sub-system 210 as an example. In general, the host system 220 can access multiple memory sub-systems via a same communication connection, multiple separate communication connections, and/or a combination of communication connections.

The memory devices 230, 240 can include any combination of the different types of non-volatile memory devices and/or volatile memory devices. The volatile memory devices (e.g., memory device 240) can be, but are not limited to, random access memory (RAM), such as dynamic random access memory (DRAM) and synchronous dynamic random access memory (SDRAM).

Some examples of non-volatile memory devices (e.g., memory device 230) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 230 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 230 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 230 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 230 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 215 (or controller 215 for simplicity) can communicate with the memory devices 230 to perform operations such as reading data, writing data, or erasing data at the memory devices 230 and other such operations. The memory sub-system controller 215 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 215 can be a microcontroller, special purpose logic circuitry (e.g., a field programmable gate array (FPGA), an application specific integrated circuit (ASIC), etc.), or other suitable processor.

The memory sub-system controller 215 can include a processing device, which includes one or more processors (e.g., processor 217), configured to execute instructions stored in a local memory 219. In the illustrated example, the local memory 219 of the memory sub-system controller 215 includes an embedded memory configured to store instructions for performing various processes, operations, logic flows, and routines that control operation of the memory sub-system 210, including handling communications between the memory sub-system 210 and the host system 220.

In some embodiments, the local memory 219 can include memory registers storing memory pointers, fetched data, etc. The local memory 219 can also include read-only memory (ROM) for storing micro-code. While the example memory sub-system 210 in FIG. 2 has been illustrated as including the memory sub-system controller 215, in another embodiment of the present disclosure, a memory sub-system 210 does not include a memory sub-system controller 215, and can instead rely upon external control (e.g., provided by an external host, or by a processor or controller separate from the memory sub-system).

In general, the memory sub-system controller 215 can receive commands or operations from the host system 220 and can convert the commands or operations into instructions or appropriate commands to achieve the desired access to the memory devices 230. The memory sub-system controller 215 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 230. The memory sub-system controller 215 can further include host interface circuitry to communicate with the host system 220 via the physical host interface. The host interface circuitry can convert the commands received from the host system into command instructions to access the memory devices 230 as well as convert responses associated with the memory devices 230 into information for the host system 220.

The memory sub-system 210 can also include additional circuitry or components that are not illustrated. In some embodiments, the memory sub-system 210 can include a cache or buffer (e.g., DRAM) and address circuitry (e.g., a row decoder and a column decoder) that can receive an address from the memory sub-system controller 215 and decode the address to access the memory devices 230.

In some embodiments, the memory devices 230 include local media controllers 235 that operate in conjunction with memory sub-system controller 215 to execute operations on one or more memory cells of the memory devices 230. An external controller (e.g., memory sub-system controller 215) can externally manage the memory device 230 (e.g., perform media management operations on the memory device 230). In some embodiments, memory sub-system 210 is a managed memory device, which is a raw memory device 230 having control logic (e.g., local media controller 235) on the die and a controller (e.g., memory sub-system controller 215) for media management within the same memory device package. An example of a managed memory device is a managed NAND (MNAND) device.

The memory sub-system 210 includes a migration management component 213 that identifies contiguous portions of memory to perform memory set operations. In some embodiments, the memory sub-system controller 215 includes at least a portion of the migration management component 213. In some embodiments, the migration management component 213 is part of the host system 220, an application, or an operating system. In other embodiments, local media controller 235 includes at least a portion of migration management component 213 and is configured to perform the functionality described herein.

For each subset of a plurality of logical pages of a respective bitmap, the migration management component 213 determines, using the following equation, $$\sum_{k=0}^{n-1} p(m+k) = \sum_{k=0}^{n-1} k + n \bigwedge_{k=0}^{n-1} p(m+k)$$

a respective subset of the plurality of logical pages of a respective bitmap is addressable by a contiguous set of physical addresses. The migration management component 213 obtains a value of a first portion of the equation represented as the following:

$$\sum_{k=0}^{n-1} p(m+k),$$

where p(x) represents a function used to translate a logical page number to its corresponding physical address, m represents a first logical page of the subset, k represents a counter variable that takes on integer value 0 to n−1, n represents a predetermined number of logical pages to include in the respective subset.

The migration management component 213 obtains a value of a second portion of the equation represented as the following:

$$\sum_{k=0}^{n-1} k + n \bigwedge_{k=0}^{n-1} p(m+k),$$

similar to the first portion of the equation, where p(x) represents a function used to translate a logical page number to its corresponding physical address, m represents a first logical page of the subset, k represents a counter variable that takes on integer value 0 to n−1, n represents a predetermined number of logical pages to include in the respective subset.

The migration management component 213 determines that the respective subset of the plurality of logical pages of a respective bitmap is addressable by a contiguous set of physical addresses by determining whether the value of the first portion of the equation matches the value of the second portion of the equation. If they match, the migration management component 213 writes a known value (e.g., zero) to all bits within a contiguous portion of the memory device 230 and/or 240 addressable by contiguous set of physical addresses. Otherwise, for each physical address of each logical page of the respective subset, the migration management component 213 writes a known value (e.g., zero) to all bits within a portion of the memory device 230 and/or 240 addressable a respective physical address. Further details with regards to the operations of the migration management component 213 are described below.

Figure 3:
FIG. 3 is a flow diagram of an example method for contiguous page detection in accordance with some embodiments of the present disclosure.
Figure 3:
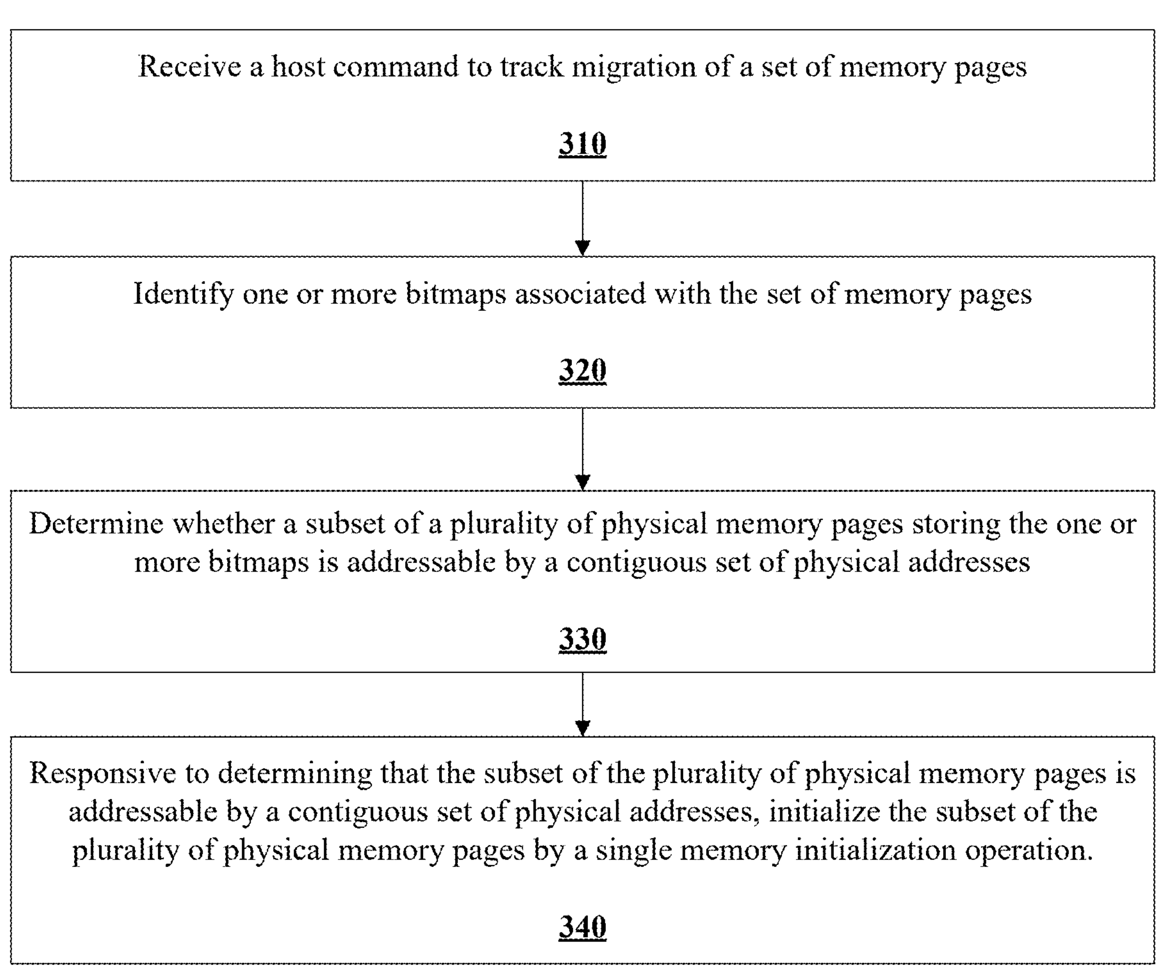

FIG. 3 is a flow diagram of an example method 300 for contiguous page detection for live migration, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the migration management component 213 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives, by a processing device, a host command to track migration of a set of memory pages. At operation 320, the processing logic identifies one or more bitmaps associated with the set of memory pages. The one or more bitmaps may include a page bitmap, a first dirty bitmap, or a second dirty bitmap. Each of the one or more bitmaps may include a plurality of logical pages. Each logical page of the plurality of logical pages corresponds to a physical memory page of the plurality of physical memory pages.

At operation 330, the processing logic determines whether a subset of a plurality of physical memory pages storing the one or more bitmaps is addressable by a contiguous set of physical addresses. To determine that the subset of the plurality of physical memory pages is addressable by a contiguous set of physical addresses, the processing logic determines that a sum of physical addresses of the subset of the plurality of physical memory pages is equal to a minimum physical address of the subset multiplied by a number of physical memory pages in the subset incremented by a sum of integers starting from a first integer to a second integer. In some embodiments, the first integer may be zero and the second integer may be one less than the number of physical memory pages in the subset.

At operation 340, responsive to determining that the subset of the plurality of physical memory pages is addressable by a contiguous set of physical addresses the processing logic initializes the subset of the plurality of physical memory pages by a single memory initialization operation. In particular, the processing logic writes all bits in the subset of the plurality of physical memory pages to a specific value.

Depending on the embodiment, the processing logic initializes each physical memory page of the subset by a single memory initialization operation responsive to determining that the subset of the plurality of physical memory pages is not addressable by a contiguous set of physical addresses.

Figure 4:
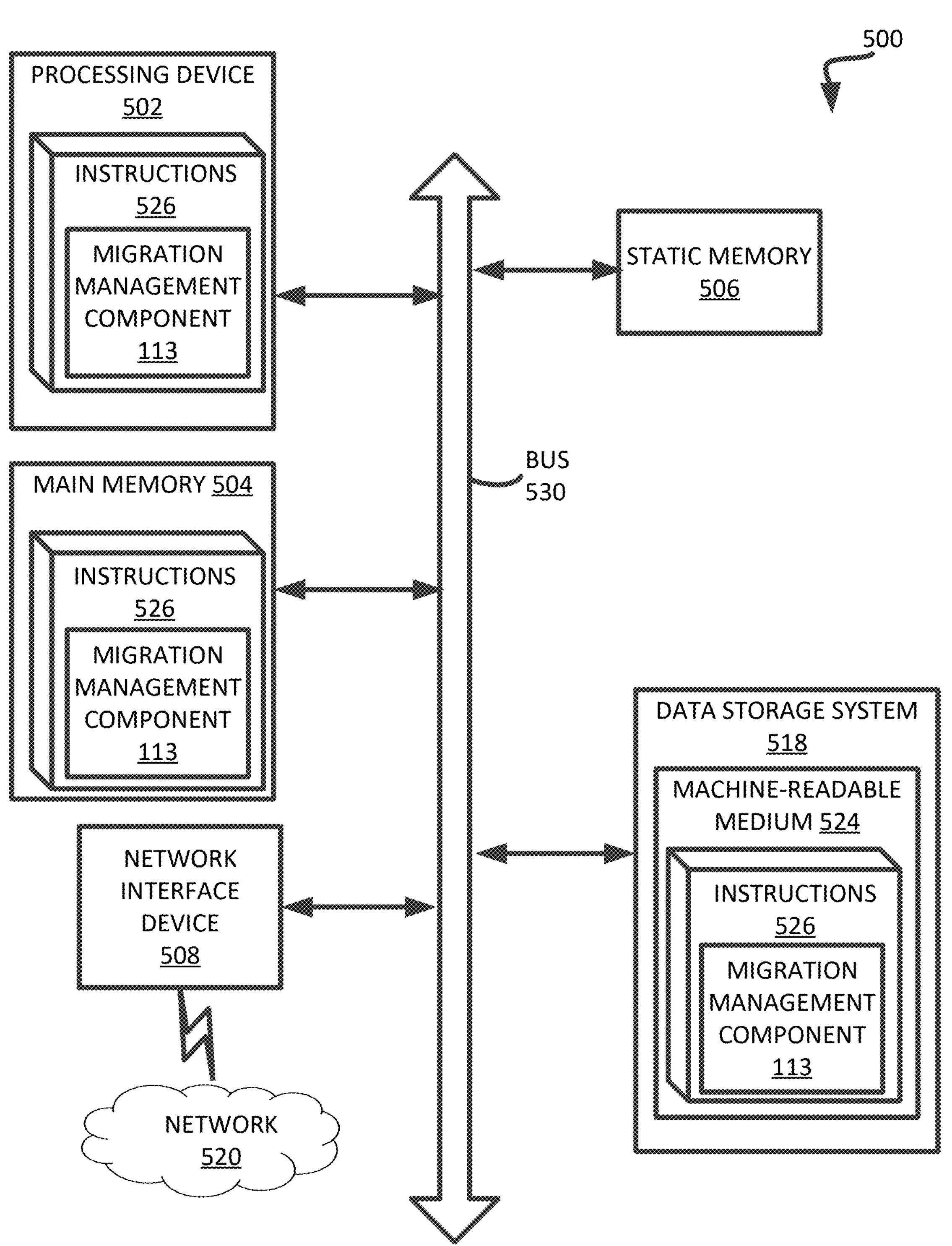
FIG. 4 is a block diagram of an example computer system in which embodiments of the present disclosure may operate.

FIG. 4 illustrates an example machine of a computer system 500 within which a set of instructions, for causing the machine to perform any one or more of the methodologies discussed herein, can be executed. In some embodiments, the computer system 500 can correspond to a host system (e.g., the host system 220 of FIG. 2) that includes, is coupled to, or utilizes a memory sub-system (e.g., the memory sub-system 210 of FIG. 2) or can be used to perform the operations of a controller (e.g., to execute an operating system to perform operations corresponding to the migration management component 213 of FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 210 of FIG. 2.

In one embodiment, the instructions 526 include instructions to implement functionality corresponding to a migration management component (e.g., the migration management component 213 of FIG. 2). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a plurality of memory devices; and a processing device, operatively coupled with the plurality of memory devices, to perform operations comprising:

receiving a host command to track migration of a set of memory pages;

identifying one or more bitmaps associated with the set of memory pages, wherein each of the one or more bitmaps is divided into a plurality of logical pages, and wherein each logical page of the plurality of logical pages is stored in a respective physical memory page;

determining, for a subset of the plurality of logical pages of a respective bitmap, whether the physical memory pages storing the subset of the plurality of logical pages are addressable by a contiguous set of physical addresses; and responsive to determining that the physical memory pages storing the subset of the plurality of logical pages are addressable by a contiguous set of physical addresses, initializing the physical memory pages storing the subset of the plurality of logical pages by a single memory initialization operation.

2. The system of claim 1, wherein determining that the physical memory pages are addressable by a contiguous set of physical addresses further comprises:

determining that a sum of physical addresses of the physical memory pages is equal to a minimum physical address of the subset multiplied by a number of physical memory pages in the subset incremented by a sum of integers starting from a first integer to a second integer.

3. The system of claim 2, wherein the first integer is zero and the second integer is one less than the number of physical memory pages in the subset.

4. The system of claim 1, wherein the processing device is to perform operations further comprising:

responsive to determining that the physical memory pages are not addressable by a contiguous set of physical addresses, initializing each physical memory page of the subset by a single memory initialization operation.

5. The system of claim 1, wherein the one or more bitmaps include one of: a page bitmap, a first dirty bitmap, or a second dirty bitmap.

6. The system of claim 1, wherein initializing the physical memory pages by a single memory initialization operation comprises writing all bits in the physical memory pages to a specific value.

7. A method comprising:

receiving a host command to track migration of a set of memory pages;

identifying one or more bitmaps associated with the set of memory pages, wherein each of the one or more bitmaps is divided into a plurality of logical pages, and wherein each logical page of the plurality of logical pages is stored in a respective physical memory page;

determining, for a subset of the plurality of logical pages of a respective bitmap, whether the physical memory pages storing the subset of the plurality of logical pages are addressable by a contiguous set of physical addresses; and responsive to determining that the physical memory pages storing the subset of the plurality of logical pages are addressable by a contiguous set of physical addresses, initializing the physical memory pages storing the subset of the plurality of logical pages by a single memory initialization operation.

8. The method of claim 7, wherein determining that the physical memory pages are addressable by a contiguous set of physical addresses further comprises:

determining that a sum of physical addresses of the physical memory pages is equal to a minimum physical address of the subset multiplied by a number of physical memory pages in the subset incremented by a sum of integers starting from a first integer to a second integer.

9. The method of claim 8, wherein the first integer is zero and the second integer is one less than the number of physical memory pages in the subset.

10. The method of claim 7, further comprising:

responsive to determining that the physical memory pages are not addressable by a contiguous set of physical addresses, initializing each physical memory page of the subset by a single memory initialization operation.

11. The method of claim 7, wherein the one or more bitmaps include one of: a page bitmap, a first dirty bitmap, or a second dirty bitmap.

12. The method of claim 7, wherein initializing the physical memory pages by a single memory initialization operation comprises writing all bits in the physical memory pages to a specific value.

13. A non-transitory computer-readable storage medium comprising instructions that, when executed by a processing device, cause the processing device to perform operations comprising:

receiving, by a processing device, a host command to track migration of a set of memory pages;

identifying one or more bitmaps associated with the set of memory pages, wherein each of the one or more bitmaps is divided into a plurality of logical pages, and wherein each logical page of the plurality of logical pages is stored in a respective physical memory page;

determining, for a subset of the plurality of logical pages of a respective bitmap, whether the physical memory pages storing the subset of the plurality of logical pages are addressable by a contiguous set of physical addresses; and responsive to determining that the physical memory pages storing the subset of the plurality of logical pages are addressable by a contiguous set of physical addresses, initializing the physical memory pages storing the subset of the plurality of logical pages by a single memory initialization operation.

14. The non-transitory computer-readable storage medium of claim 13, wherein determining that the physical memory pages are addressable by a contiguous set of physical addresses further comprises:

determining that a sum of physical addresses of the physical memory pages is equal to a minimum physical address of the subset multiplied by a number of physical memory pages in the subset incremented by a sum of integers starting from a first integer to a second integer.

15. The non-transitory computer-readable storage medium of claim 14, wherein the first integer is zero and the second integer is one less than the number of physical memory pages in the subset.

16. The non-transitory computer-readable storage medium of claim 13, wherein the processing device is to perform operations further comprising:

responsive to determining that the physical memory pages are not addressable by a contiguous set of physical addresses, initializing each physical memory page of the subset by a single memory initialization operation.

17. The non-transitory computer-readable storage medium of claim 13, wherein the one or more bitmaps include one of: a page bitmap, a first dirty bitmap, or a second dirty bitmap.

18. The non-transitory computer-readable storage medium of claim 13, wherein initializing the physical memory pages by a single memory initialization operation comprises writing all bits in the physical memory pages to a specific value.

* * * * *